US008670221B2

(12) United States Patent
Gillespie et al.

(10) Patent No.: US 8,670,221 B2
(45) Date of Patent: Mar. 11, 2014

(54) TERMINAL BLOCK FOR SURGE PROTECTION HAVING INTEGRAL DISCONNECT

(75) Inventors: Brian John Gillespie, Hummelstown, PA (US); Christopher Jon Laubach, Marietta, PA (US); Russell David Moser, Lewisberry, PA (US); David Michael McClellan, Camp Hill, PA (US); Scott Keith Mickievicz, Elizabethtown, PA (US); Michael P. Lacey, Harrisburg, PA (US)

(73) Assignee: Phoenix Contact Development & Manufacturing, Inc., Middletown, PA (US)

( * ) Notice: Subject to any disclaimer, the term of this patent is extended or adjusted under 35 U.S.C. 154(b) by 90 days.

(21) Appl. No.: 13/213,117

(22) Filed: Aug. 19, 2011

(65) Prior Publication Data

US 2012/0081827 A1 Apr. 5, 2012

Related U.S. Application Data

(60) Provisional application No. 61/388,166, filed on Sep. 30, 2010.

(51) Int. Cl.
*H01C 7/12* (2006.01)
*H02H 1/04* (2006.01)

(52) U.S. Cl.
USPC .......................................................... 361/118

(58) Field of Classification Search
USPC .......................................................... 361/118
See application file for complete search history.

(56) References Cited

U.S. PATENT DOCUMENTS

| | | | | |
|---|---|---|---|---|
| 1,988,650 | A | 1/1935 | Everett | |
| 2,386,729 | A | 10/1945 | Watter | |
| 2,688,105 | A | 8/1954 | Hasselhorn | |
| 5,001,587 | A | 3/1991 | Clark | |
| 5,557,067 | A * | 9/1996 | Messelhi | 174/59 |
| 5,836,791 | A | 11/1998 | Waas et al. | |
| 7,110,534 | B1 * | 9/2006 | Mullaney et al. | 379/428.01 |
| 2003/0186596 | A1 | 10/2003 | Baum et al. | |
| 2004/0246644 | A1 * | 12/2004 | Sato et al. | 361/119 |
| 2010/0203773 | A1 * | 8/2010 | Henke et al. | 439/709 |
| 2011/0163775 | A1 * | 7/2011 | Wing et al. | 324/756.05 |

FOREIGN PATENT DOCUMENTS

| | | |
|---|---|---|
| DE | 1538497 | 12/1966 |
| DE | 3918651 A1 | 12/1990 |

(Continued)

*Primary Examiner* — Scott Bauer
(74) *Attorney, Agent, or Firm* — McNees Wallace & Nurick LLC

(57) ABSTRACT

A terminal block is disclosed that integrates a surge protection base, a disconnect and connection points to provide a Kelvin connection in which a surge protection element is in electrical communication with the ground and the connection points for incoming and outgoing wires. The terminal block includes a terminal body having a terminal body housing, a plurality of conductive elements arranged within the terminal body to create a continuous electrical path therethrough and a disconnect switch integral the terminal body, the switch arranged to open the continuous electrical path and expose a terminal. The terminal body is configured to receive a surge protection element and the surge protection element, when received in the terminal body, forms a portion of the continuous electrical path.

24 Claims, 15 Drawing Sheets

(56) References Cited

FOREIGN PATENT DOCUMENTS

| | | | |
|---|---|---|---|
| DE | 29921080 | U1 | 1/1999 |
| DE | 10001667 | C1 | 1/2000 |
| DE | 10304492 | A1 | 8/2004 |
| DE | 202008003295 | U1 | 8/2009 |
| EP | 1883132 | A1 | 1/2008 |
| FR | 1314796 | | 12/1962 |
| GB | 758977 | | 6/1954 |
| WO | 9904455 | A1 | 1/1999 |
| WO | 2009052949 | A1 | 4/2009 |

* cited by examiner

TERMINAL BLOCK FOR SURGE PROTECTION HAVING INTEGRAL DISCONNECT

CROSS-REFERENCE TO RELATED APPLICATIONS

This application claims the benefit of priority to U.S. Provisional Application No. 61/388,166, filed Sep. 30, 2010, which is incorporated by reference in its entirety.

FIELD

The present invention is directed to terminal blocks for use in surge protection applications and more particularly to terminal blocks for use in surge protection applications having an integral disconnect.

BACKGROUND

Railroad signal systems are used to relay electrical power and signals from a central location, such as a wayside shed, over long distances to track switches, rail crossings, signal lights and other devices used in rail control. Power is distributed to these remote control devices from the central location through individual circuits arranged in an array at the central location and terminated via threaded posts, typically using ring terminated wires secured to the posts using nuts. Surge protection is typically provided for each circuit in the system, with a surge protector terminated to the threaded posts and bridged to a ground bus. FIG. 1 is an illustration of a prior art terminal block in which a wire coming into the system from the field is attached to a threaded post with a ring terminal. The field wire is secured to the post with a nut. The field wire is in electrical communication with a "house" wire that is typically locally connected elsewhere within the rail logic control system at the central location via a second threaded post. The field and house wires are also in electrical communication with a spark gap surge protection device contained within a transparent housing via the threaded posts and which is connected to ground via a third threaded post in the event of an overvoltage condition.

This arrangement, an example of which is shown in FIG. 1, is a mature technology that has generally worked well over time in its operation. However, servicing these systems is labor intensive and has numerous drawbacks associated with maintaining them.

For example, the AREMA manual recommends a periodic test of each field wire to verify its insulation integrity, sometimes referred to as a "megger" test. In the case of most rail control systems, each of what may be many hundreds of individual wires must be independently separated from the circuit for testing with a 1000 VDC charge, then reconnected before the next wire can be tested. For switching of circuits, a system of nuts and leaf springs are used that disconnects the circuit by removing the nut, sometimes referred to as the "golden nut." As a result, conducting an insulation integrity test with current technology requires loosening and removing each nut, testing, and the reattachment/retorquing of the nut, which can easily be dropped or become lost, increasing time and expense. Additionally, the leaf spring used in combination with the nut is not always as reliable as might be desired if the proper torque is not applied to the nuts, which have to be checked periodically to avoid circuits coming loose as a result.

The advent of new rail safety protocols, including increased frequency of inspection and testing procedures, combined with other advancements in technologies that can increase the number of safety and control devices implemented along a given section of rail is likely to amplify the drawbacks associated with servicing current rail logic control systems. These drawbacks may be compounded by the need to use larger, more complicated distribution arrays that take up a significant amount of space at the central location, which is often little more than a small shed or cabinet.

Among other disadvantages faced in current rail logic system arrays include that the existing system takes a long time to terminate. Field wires in railroad signal systems are typically a 6 AWG or other heavy gauge wire; these wires must typically be stripped and bent and attached to ring terminals, all of which takes a significant amount of effort because of the thickness of the wire. Furthermore, in current equipment practice it is not always clear when the circuit is disconnected; as a result, because the threaded studs are exposed and not safe to touch when energized, safety issues may be present also.

As previously mentioned, circuit termination arrangements in current rail control systems further include surge protection to protect against overvoltage situations which may occur, for example, during lightening strikes that follow the field wires back to the point where a particular device connects to the array in the control system at the central location. The surge protector used in conventional systems, sometimes referred to as an "ice cube" because of its transparency and shape, is bolted down and can take a long time to maintain. Furthermore, the surge protection does not have a readily identifiable good/bad indication for monitoring alarms remotely, and in some cases even on-site visual inspection can be difficult despite the transparent walls, which may become dirty or cloudy from past surge events.

These and other drawbacks are present in current railroad signal systems.

SUMMARY

According to exemplary embodiments of the invention, a terminal block with surge protection having an integral disconnect is provided that can overcome these and other drawbacks associated with current railroad signal systems.

In one embodiment, a terminal block comprises a terminal body having a terminal body housing, the terminal body configured to receive a surge protection element; a plurality of conductive elements arranged within the terminal body to create a continuous electrical path therethrough; and a disconnect switch integral the terminal body, the switch arranged to open the continuous electrical path. The surge protection element, when received in the terminal body, forms a portion of the continuous electrical path so as to be in electrical communication with a first wire, a second wire, and a ground when the terminal block is in operation and the circuit is closed.

In another embodiment, a terminal block for a railroad signal system comprises a terminal body having a terminal body housing, the terminal body having a surge protection cartridge receptacle, a field wire receptacle, a house wire receptacle and a ground receptacle formed therein; a field clamp positioned within the terminal body adjacent the field wire receptacle to receive and retain a field wire of the railroad signal system inserted therein; a first conductive element in electrical communication with the field clamp and a disconnect switch; and a second conductive element in electrical communication with the disconnect switch and a house clamp, the house clamp positioned within the terminal body adjacent the house wire receptacle to receive and retain a house wire of the railroad signal system inserted therein. The second conductive element is further in electrical communication with a first contact of a surge protection element, the surge protection element having a second contact in electrical communication with a third conductive element, wherein the third conductive element is in electrical communication with a ground clamp adjacent the ground receptacle. The surge protection element is disposed within a cartridge received by the terminal body.

In yet another embodiment, two or more such terminal blocks are connected using a conductive bridge to form a common circuit.

In still another embodiment, a method of implementing surge protection in a circuit of a railroad signal system comprises providing a terminal block in accordance with exemplary embodiments, securing the terminal block in a wayside rail shed; providing a surge protection element to the terminal body; terminating a field wire of a railroad signal system entering the wayside rail shed at a location internal the terminal body and terminating a house wire of a railroad signal system internal the terminal body to form the continuous electrical path between the field wire and the house wire via the disconnect switch; and connecting the terminal block to ground, such that the continuous electrical path further extends from the house wire through the surge protection element to ground.

In still yet another embodiment, a surge protection cartridge comprises a cartridge housing; a spark gap surge protection element contained with the cartridge housing; and a plurality of terminals configured to engage a terminal block and thereby secure the cartridge thereto.

According to another embodiment, a terminal block having at least three modes of surge protection comprises a terminal body having a terminal body housing, the terminal body configured to receive at least two surge protection cartridges, each containing a surge protection element, and at least one equalizer cartridge; a plurality of conductive elements arranged within the terminal body to create a plurality of continuous electrical paths therethrough; and a disconnect switch integral the terminal body, the switch arranged to open at least one of the continuous electrical paths. The terminal body is configured to provide surge protection to at least two separate circuits terminated in the terminal body.

According to another embodiment, a terminal block comprises a terminal body having a terminal body housing; a plurality of conductive elements arranged within the terminal body to create a continuous electrical path therethrough; and a disconnect switch integral the terminal body, the switch arranged to open the continuous electrical path and expose a terminal.

Exemplary embodiments integrate a surge protection base, a disconnect and connection points for field and house wires and a ground to provide a Kelvin connection in which the surge protector (typically a spark gap or MOV-based cartridge assembly) is in electrical communication with the ground and both the field and house wires. Furthermore, because the base can be provided as a single unit, it can snap on a DIN rail, reducing time for installation.

Exemplary embodiments also make use of a termination that permits the wires to be stripped and inserted into the terminal body, without the need for crimping on ring terminals, bending loops or hooks.

Furthermore, the terminal block includes a disconnect switch. Unlike current practice that can result in lost hardware, the switch is integral the terminal block, meaning there are no separable parts that can get lost. Furthermore, the disconnect switch and terminal housing are cooperably configured so that the conductive elements of the circuit are shielded by the terminal body when the circuit is closed. When the disconnect switch is actuated to open the circuit, a conductive element of the disconnect switch that remains in electrical communication with the field wire is revealed so that an insulation integrity test can be performed but without exposure of conductive elements that remain energized, all of which increases safety for technicians or other persons operating in the vicinity of the terminal block.

Because leaf springs used in current solutions are only disconnected when the “golden nut” is backed away from it, there is no easy visual cue that a connection has been made or disconnected. In addition to the way in which the disconnect switch is activated, exemplary embodiments may use a switching mechanism with a contrasting color to make it even clearer when the circuit is disengaged.

In certain embodiments, the surge protection element is contained within a pluggable cartridge that can be removed and replaced while the circuit is connected and active, without replacing the entire terminal block or disconnecting the circuit. The terminal block may also include a status indicator to identify when the cartridge needs to be replaced and the terminal block may take itself off-line when the surge protection element has failed and trips a contact to alert that the circuit is unprotected.

Other features and advantages will be apparent from the following more detailed description of exemplary embodiments, taken in conjunction with the accompanying drawings which illustrate, by way of example, the principles of the invention.

BRIEF DESCRIPTION OF THE DRAWINGS

Where like parts appear in more than one drawing, it has been attempted to use like reference numerals for clarity.

DETAILED DESCRIPTION OF EXEMPLARY EMBODIMENTS

While embodiments described herein are primarily discussed in the context of a railroad signal system, such as a railroad signal system, it will be appreciated that the invention is not so limited and may be used in conjunction with any application in which a terminal block that includes surge protection might be useful.

Figure 1:
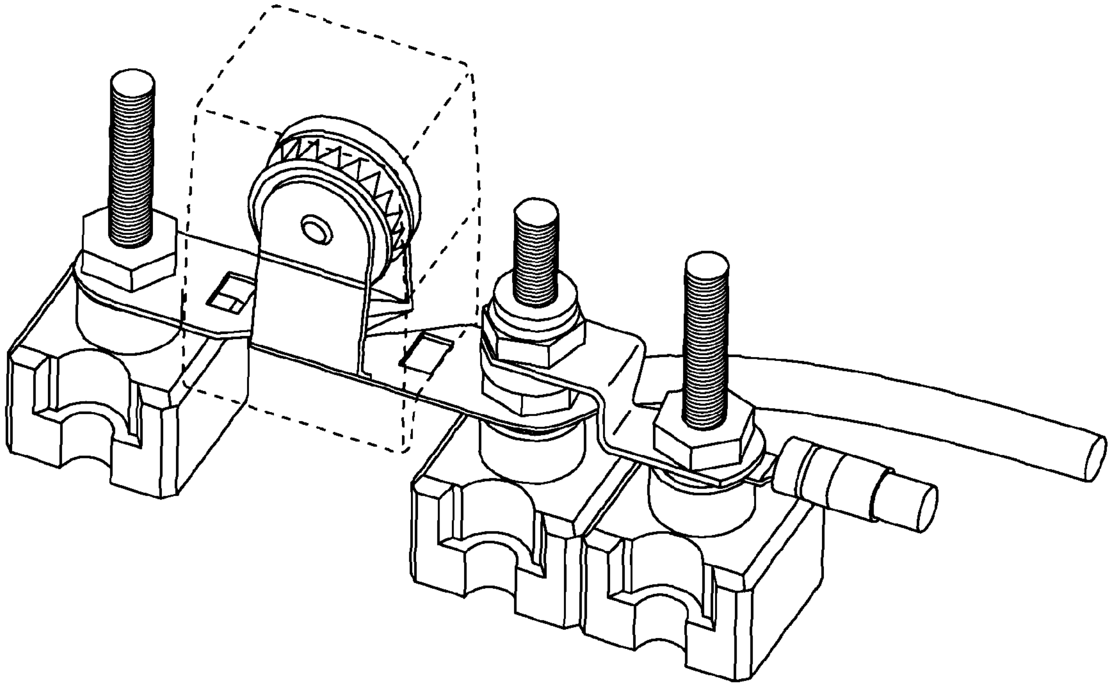
FIG. 1 PRIOR ART
FIG. 1 illustrates the current state of the art for railroad signal terminal block design.
Figure 2:
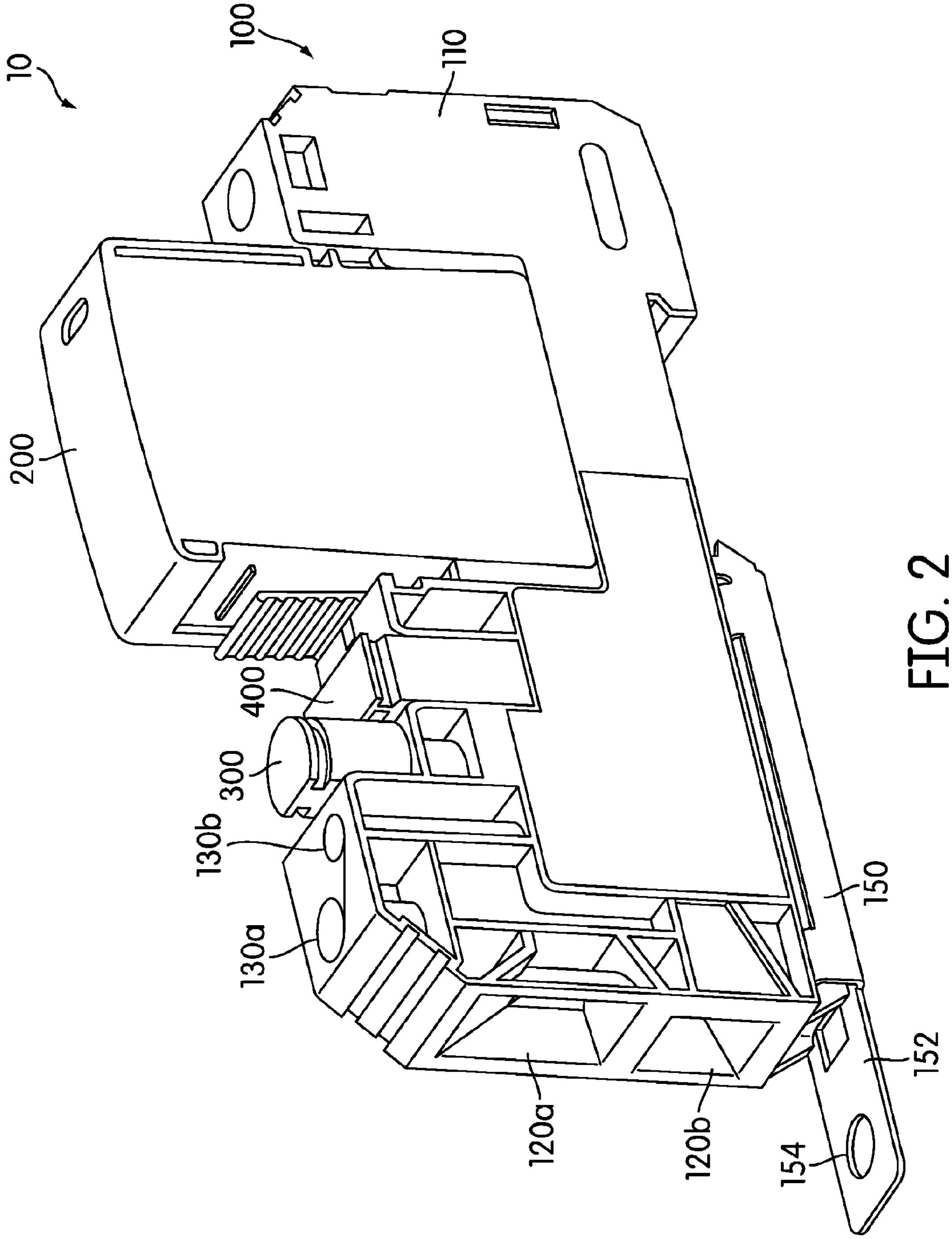
FIG. 2 illustrates a terminal block in accordance with an exemplary embodiment.

FIG. 2 illustrates a terminal block 10 in accordance with an exemplary embodiment. The terminal block 10 has a body 100 that includes a housing 110 that substantially encloses most or all of the electrical connections and related conductive elements along the conductive path. The enclosure increases safety by terminating first and second wires (omitted here for clarity but shown in FIGS. 12-15 as reference numerals 12 and 14, respectively) within the body 100. The terminal body can be constructed for use in 18 mm pitch systems, 1 inch pitch systems, or any other suitable pitch that may be employed.

The terminal block 10 terminates a first and second wire which are part of a single circuit. The first wire may be selectively disconnectable from the surge protection while the second wire may be in continuous electric communication with the surge protection when the wires are terminated within the terminal block 10. The first and second wires are commonly referred to as field and house wires in the context of railroad signal systems. The field wire may be disengaged from surge protection, for example, in order to conduct an insulation integrity test of that wire that extends back to a signal in the field, while the house wire, typically connected locally, still remains subject to surge protection. It will be appreciated, however, that there may be circumstances in which the terminal block 10 could be arranged so that the local house wire may be switched while the field wire remains continuously protected by the surge protection element.

The field and house wires are received by wire receptacles 120*a,* 120*b* formed in the body 100, and are secured within the housing by a clamp or other conductive retention element as described more fully elsewhere herein. In the case of railroad signal systems, the field wire is typically, but not necessarily, a heavy gauge wire, such as the 6 AWG field wires currently in use with wayside rail sheds. In such cases, it may be desirable to configure the terminal block so that the field wire is inserted into the upper wire receptacle 120*a*. Each of the wire receptacles 120*a*, 120*b* may include a corresponding access aperture 130*a,* 130*b.* In this way, after the field and house wires have been inserted, these apertures provide access for a tool, such a screwdriver, to tighten a clamp internal the terminal body 100 and secure the wires therein. Inserting stripped ends of the field and house wires directly into the terminal body 100 has the advantage of reducing much of the difficulty associated with terminating the heavy gauge wire used in most railroad signal systems.

The terminal block 10 includes surge protection capability for the circuit with which it is employed. The surge protection element may be an MOV or other suitable element, such as a spark gap, also contained within the terminal block 10. As illustrated in FIG. 2, the surge protection element is contained within a cartridge 200, the terminal body 100 being configured to receive the cartridge 200, such that the cartridge 200 can be plugged into an outlet formed in the terminal body 100. Alternatively, the surge protection element may be provided in a more permanent manner, such as enclosed within the terminal body 100, although in such cases the entire terminal block 10 rather than just the cartridge 200 may need to be replaced following a surge event that results in an intended sacrificial failure of the surge protection element. The terminal block 10 provides a Kelvin connection in which the surge protector is in electrical communication with the ground and both the field and house wires.

Figure 3:
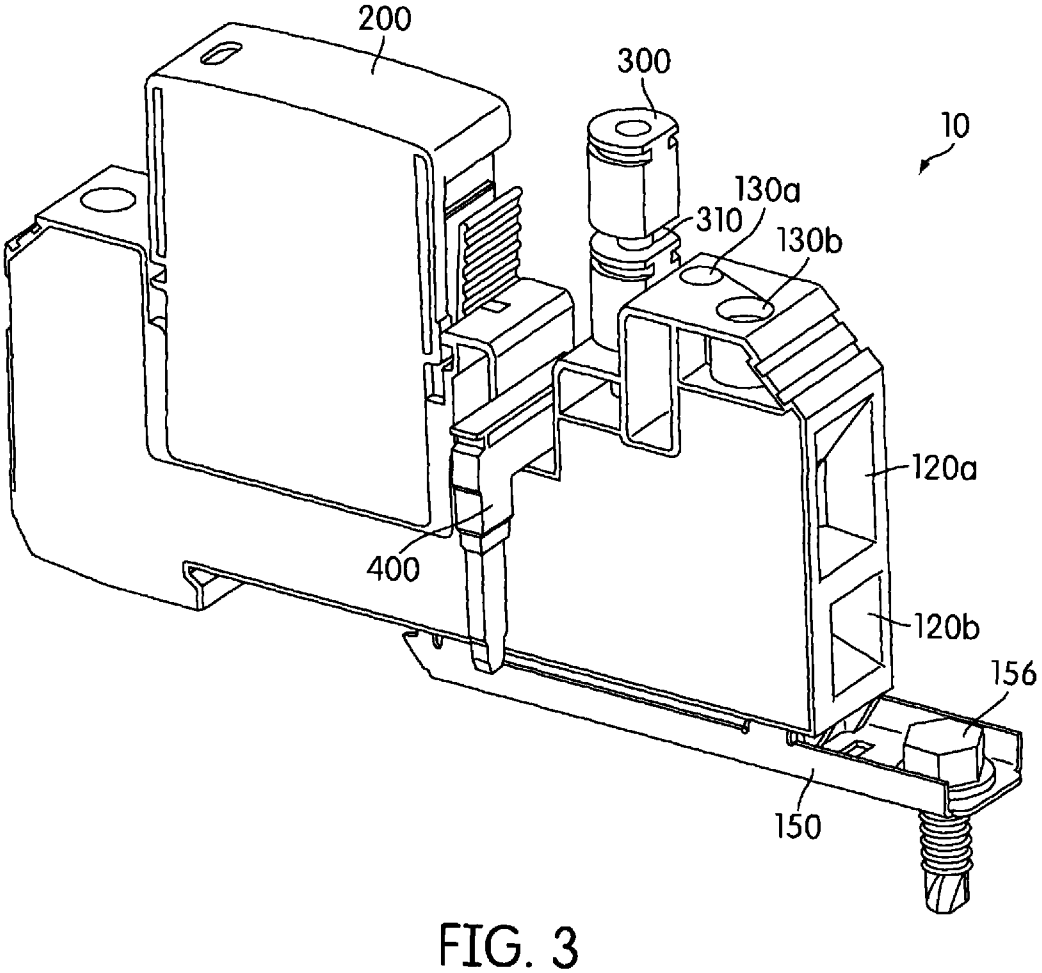
FIG. 3 illustrates an alternative view of the terminal block of FIG. 2.

The terminal block 10 can be mounted on a DIN rail (not shown) using a rail slide 150. As shown in FIGS. 2 and 3, the rail slide 150 may include an extension 152 containing an aperture 154 through which a fastener 156, such as a TEK screw, may be inserted to secure the terminal block 10 to a mounting panel (not shown). The use of a secondary retention device like a screw or other fastener 156 to secure the terminal block 10 in place provides stability that can provide additional leverage during insertion and removal of the field and house wires from the terminal block 10.

Figure 4:
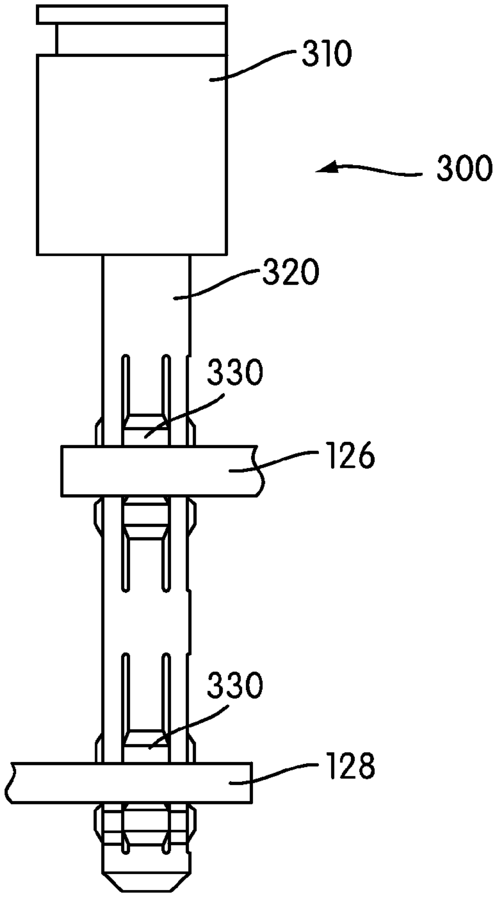
FIG. 4 illustrates a disconnect switch used with a terminal block according to certain exemplary embodiments.

Exemplary embodiments further include a circuit disconnect switch 300 integrated with the terminal block 10, which overcomes numerous disadvantages associated with the leaf springs, nuts and other loose parts used in current equipment practices, as well as provides for greater safety, as discussed earlier. As illustrated in FIGS. 2 and 3, the circuit disconnect switch 300 moves in a substantially single direction from the closed (FIG. 2) to open (FIG. 3) position. As better seen in FIG. 4, the disconnect switch 300 may be a dual spring pin switch. As illustrated, the switch 300 includes an insulative cap 310 and a conductive pin 320, having two spring latches 330. The disconnect switch 300 is disposed through two contacts positioned internal the body 100 as discussed subsequently in more detail with respect to FIG. 7. Each contact is in electrical communication with either the house or field wire entering the terminal block; when the disconnect switch 300 is in the closed position, the pin 320 concurrently touches both contacts to complete the circuit and carry current between the field and house wires. When in the open position, such as may occur by actuating the disconnected switch 300 by pressing the cap 310 to release the spring latches 330, the pin 320 is in contact with only the upper contact, usually associated with the field wire.

Figure 5:
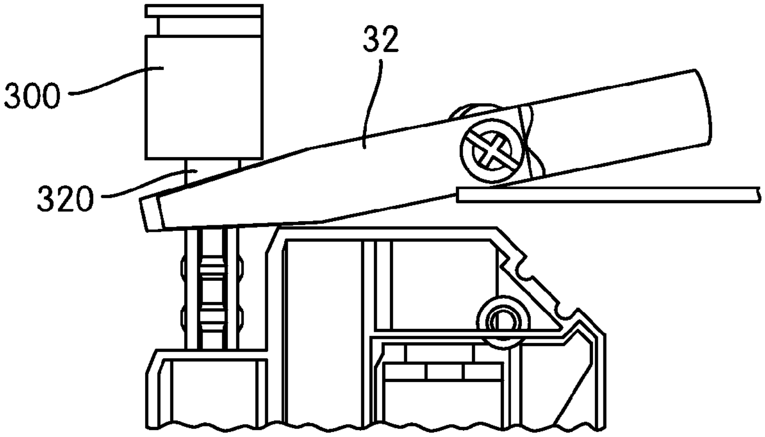
FIG. 5 illustrates a test connection attached to the disconnect switch of FIG. 4.

Turning to FIG. 5, as the switch 300 is disconnected and moved to the open position, the pin 320 is elevated above the body 100, exposing its conductive surfaces. Because the pin 320 also remains in contact with the upper contact (in most cases in electrical communication with the field wire and illustrated here at field plate 126 as discussed subsequently with respect to FIG. 7), the exposed pin 320 can serve as a test point for conducting insulation integrity testing of the field wire. As FIG. 5 further shows, an alligator clip 32 or other device can be clipped to the exposed pin 320 to conduct testing without having to remove the field wire from the terminal block 10. When the testing is complete, the disconnect switch 300 can be actuated back to its closed position to re-establish the circuit and return the terminal block 10 to normal operation. FIG. 8 shows an alternative embodiment in which the disconnect switch 300 is a variant pin. The use of a variant pin may be desirable in some cases, as it may be better able to withstand mechanical forces generated during a surge event that could cause the switch 300 to be ejected.

Figure 6:
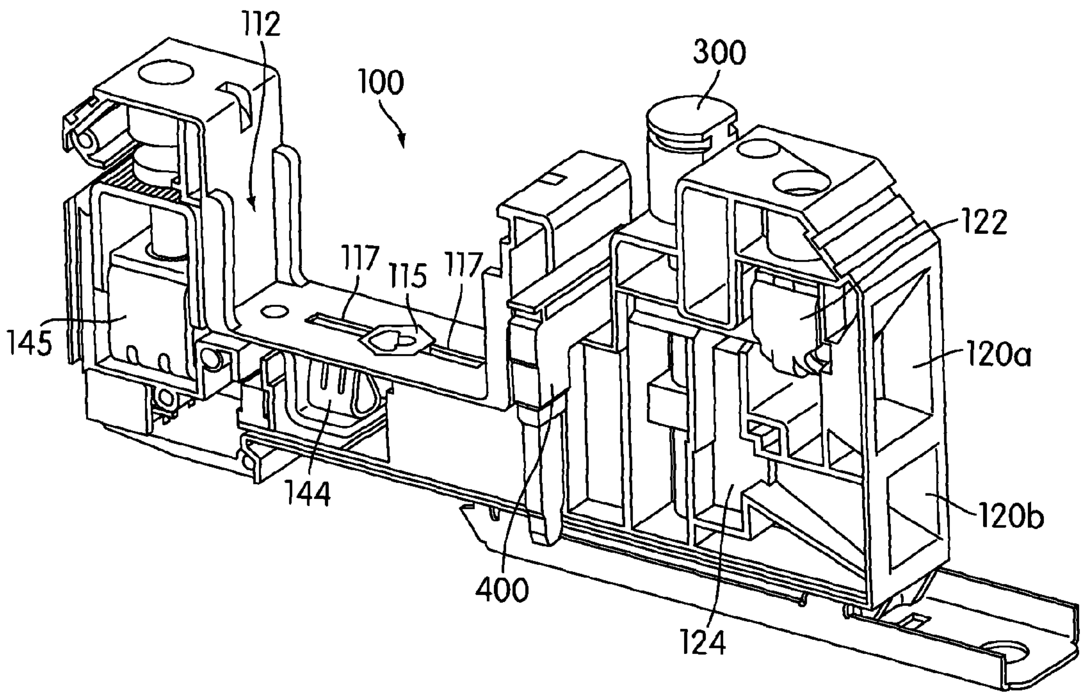
FIG. 6 illustrates a partial internal view of a terminal block base in accordance with an exemplary embodiment.

FIG. 6 shows the terminal body 100 without the cartridge situate in the body's cartridge receptacle 112. The cartridge receptacle 112 may include a keying feature 115 that mates with a corresponding keying feature of the cartridge. The use of one or more keying features may assist to ensure proper insertion during initial installation and subsequent replacement of the cartridge. In one embodiment, a multi-position or dial type key 115 may be used to prevent improper cartridge and base combinations from inadvertently being made. The cartridge receptacle 112 of the terminal body 100 further may include one or more terminal receivers 117 so that metal contacts protruding from the cartridge can be inserted internal the terminal body 100 to be received by corresponding contacts contained therein.

Figure 7:
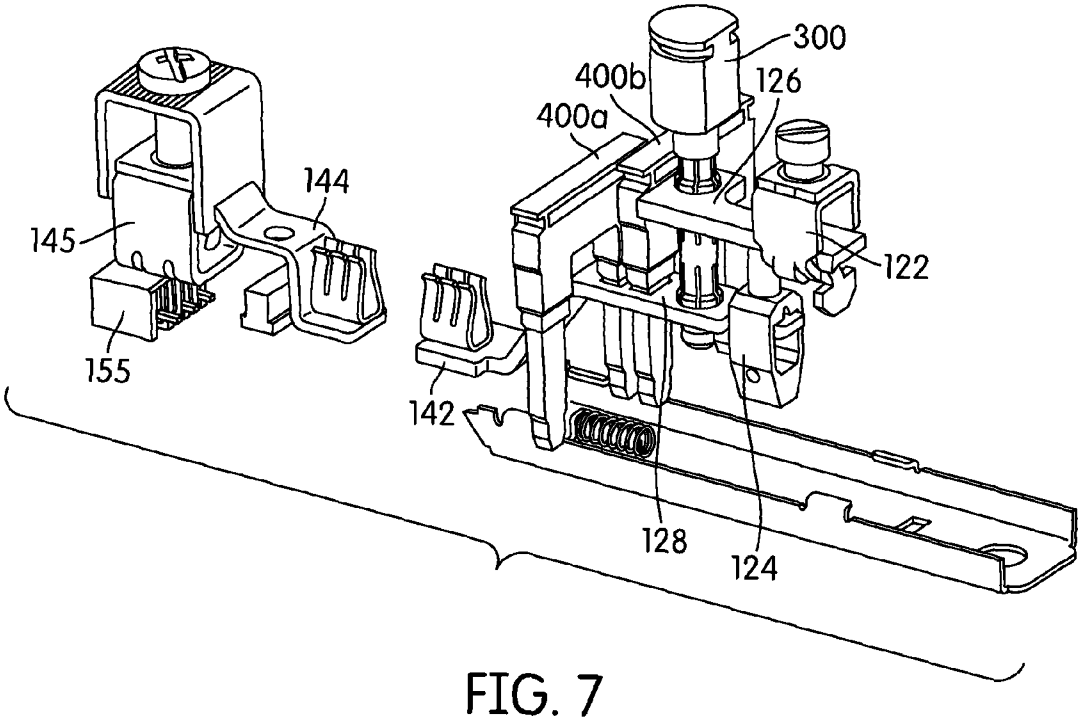
FIG. 7 illustrates internal conductive elements of the terminal block base shown in FIG. 6.
Figure 8:
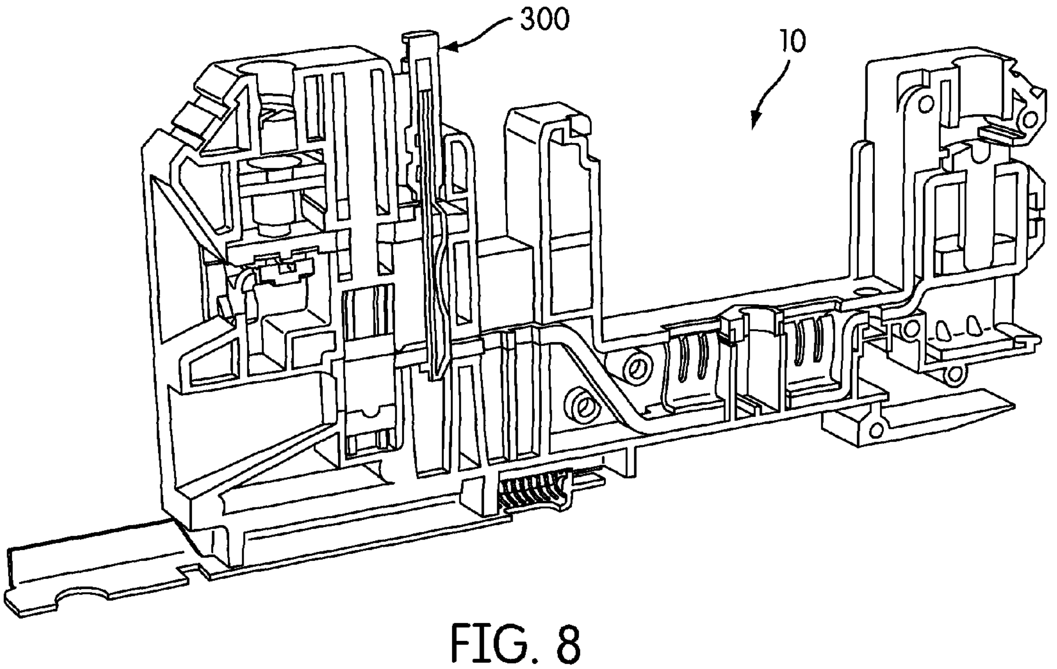
FIG. 8 illustrates a partial internal view of a terminal block back in accordance with another exemplary embodiment.

FIG. 6 also shows the terminal body 100 with a side of the terminal body housing 110 removed to reveal the internal components, while FIG. 7 illustrates the terminal body 100 with the entire housing 110 removed. With the housing 110 removed, the conductive components that provide the pathway for the electric circuit can be more easily seen. The field wire (not shown), after insertion into the terminal body 110 via the upper wire receptacle 120*a* is secured by a field clamp 122 that holds the wire in contact with a field plate 126. The field plate is in switchable electrical communication with a house plate 128 via the disconnect switch 300. The house plate 128 is secured to the house wire via a house clamp 124, following insertion of the house wire into the house clamp 124 through the lower wire receptacle 120*b*. Although the field and house clamps 122, 124 are illustrated as rising cage clamps, it will be appreciated that any suitable clamp for securing the conductors in contact with the conductive plates to complete the circuit may be employed.

As also best seen in FIG. 7, the house plate 128 also extends in a direction away from the house clamp to a tulip contact 142 or other suitable contact for receiving a corresponding male contact from the cartridge when the cartridge is plugged into the terminal block 10 and received in the cartridge receptacle 112 in the terminal body 100. From the cartridge (which adds the surge protection element to the circuit), the electrical path returns internal the terminal body 100 from a second male contact of the cartridge to a ground plate 144 having its own tulip contact to receive the cartridge's second male contact. The ground plate 144 connects to a ground clamp 145 that can be used to connect the terminal block 10 to ground via an appropriate conductor, such as a wire or bus. It will be appreciated that the tulip contacts may be attached to the ground and house plates by any suitable method, such as welding. It will further be appreciated that in some cases, the tulip contact and its respective house or ground plate may each be constructed as a single monolithic piece.

In some embodiments, the terminal block 10, and in particular the terminal body 100, may be equipped with a status indicator to provide information on operational status of the terminal block and more particularly of the surge protection element. The status indicator may be a visual indicator, such as an LED, for ready, local identification of a failed surge protection cartridge or other surge protector mechanism. Alternatively or in combination with the visual indication, the status indicator may include a remote monitoring device 155 that can send signals regarding status to a monitoring site remote from the central location, where that information may be used for analysis and/or for a subsequent undertaking, such as generating an alert. The signal may be sent over a land line, such as a telephone or Ethernet line, or may be a WiFi, Bluetooth or other wireless signal. To prevent the remote monitoring device 155 from becoming disabled as a result of a surge event, the device 155 may include a circuit electrically isolated from the circuit being protected by the surge protection system.

As still further illustrated with respect to FIGS. 6 and 7, the house plate 128 may contain one or more additional apertures to receive one or more bridges 400*a*, 400*b* that may be used to gang together one or more additional terminal blocks 10 as part of a single circuit. The use of two bridge apertures to permit up to two bridge elements per terminal block permits infinite bridging capability for as many terminal blocks are desired to be ganged together.

Figure 9:
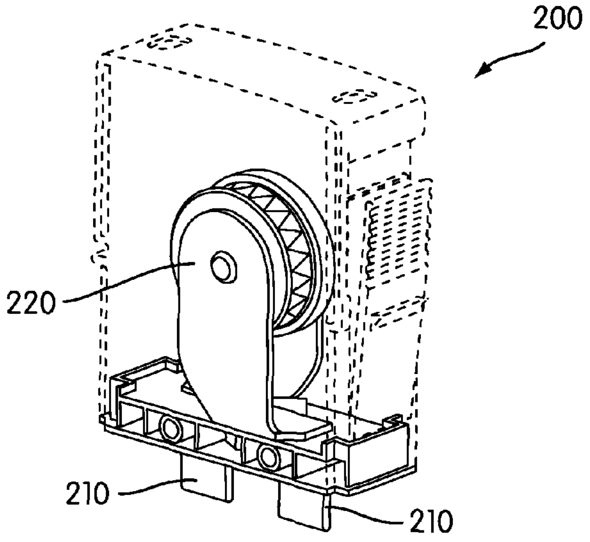
FIG. 9 illustrates a surge protector cartridge in accordance with an exemplary embodiment.
Figure 10:
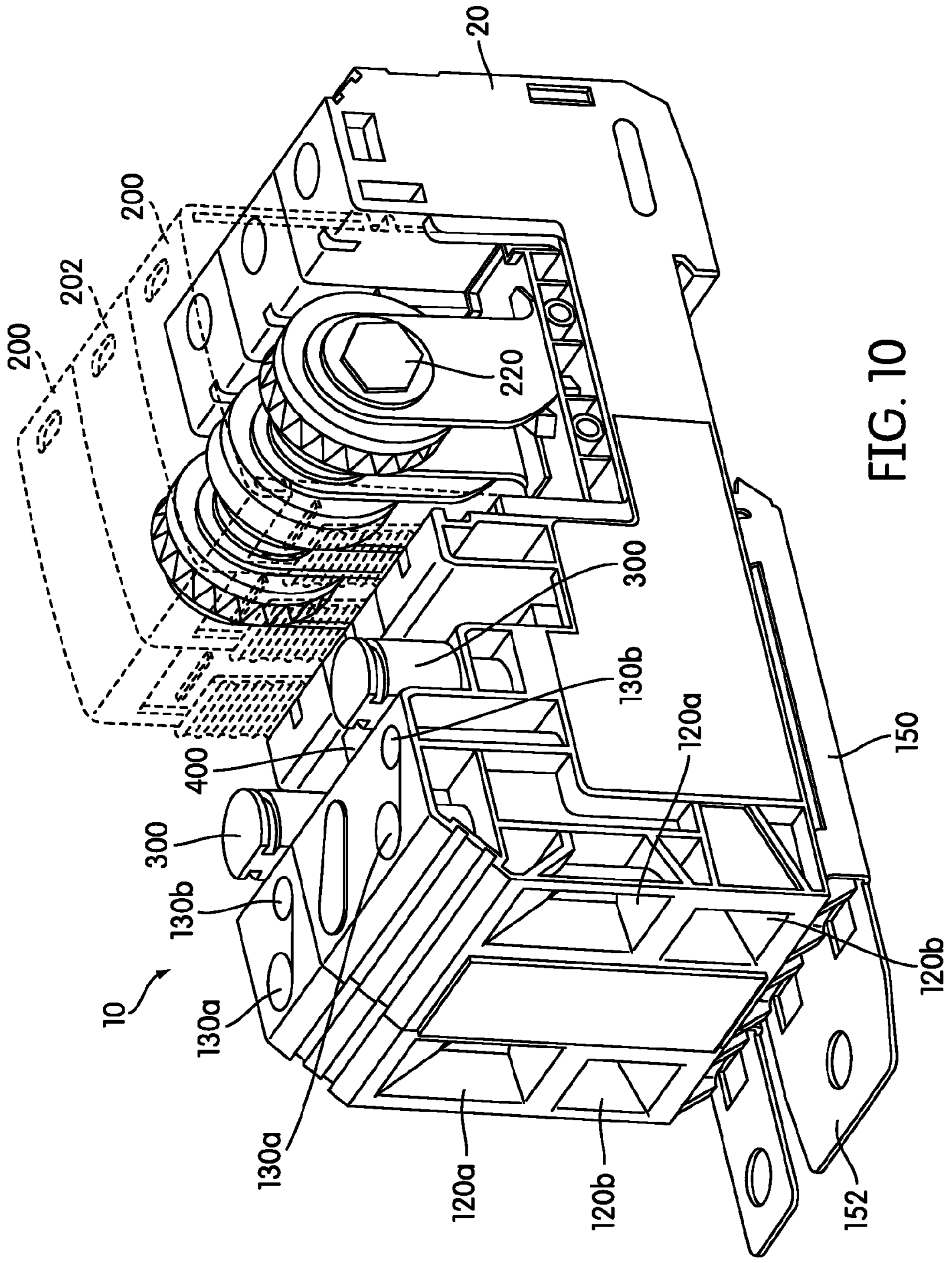
FIG. 10 illustrates a gang of terminal blocks in accordance with an exemplary embodiment.

An example of a ganged circuit is illustrated in FIG. 10, in which two terminal blocks 10, 20 are coupled by a bridge 400. FIG. 10 further illustrates that the cartridge 200 may contain a spark gap element 220 and that the cartridge walls may be formed of a clear acrylic somewhat similar to the "ice cube" surge protection element used in conventional railroad signal systems. As better seen in FIG. 9, the spark gap element 220 is contained within the walls of the cartridge 200 to separate it from the surrounding environment, while metal contacts 210 extend from the cartridge 200 to be received by the terminal body 110 through the terminal receivers 117 (FIG. 6) into the tulip contacts. It will be appreciated, as previously discussed, that the surge protection element could also be an MOV or other suitable element and that in either case, that the cartridge walls could be opaque.

FIG. 10 further illustrates that a single terminal block 10 may be capable of receiving multiple cartridges. As shown, an equalizer cartridge 202 is provided in addition to the primary cartridge 200. When used in combination with another terminal block ganged by a bridge, the equalizer cartridge 202 can be used to equalize the load between adjacent terminal blocks.

Figure 16:
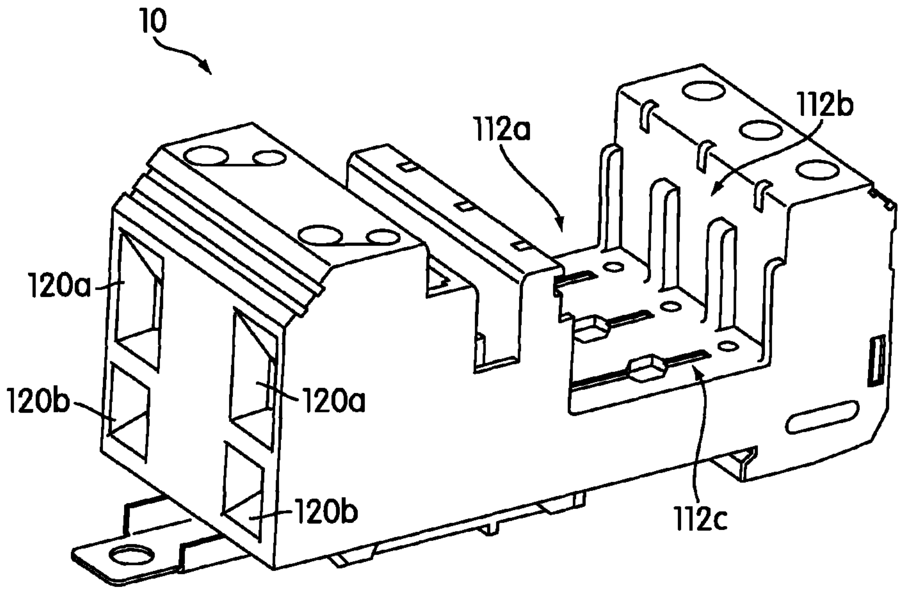
FIG. 16 illustrates a terminal block in accordance with an exemplary embodiment.
Figure 17:
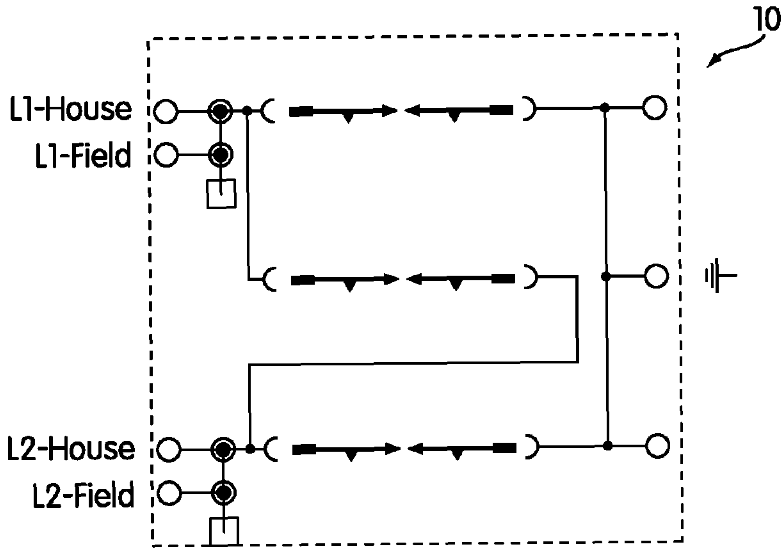
FIG. 17 schematically illustrates the electrical path of the terminal block of FIG. 16.

Referring to FIGS. 16 and 17, a monolithic triple-wide version of a terminal block 10 is shown. In this embodiment, the terminal block includes three cartridge receptacles 112*a*, 112*b*, 112*c*; typically each of the outer cartridge receptacles (112*a*, 112*c*) would receive a surge protection cartridge containing a surge protection element, while a cartridge containing an equalizer element would be situated intermediate the two surge protection cartridges. As illustrated in the schematic shown in FIG. 17, when the cartridges are inserted, the terminal block in this embodiment contains multiple electrical paths and terminates two separate circuits (L1 and L2) while providing for three modes of surge protection.

Figure 11:
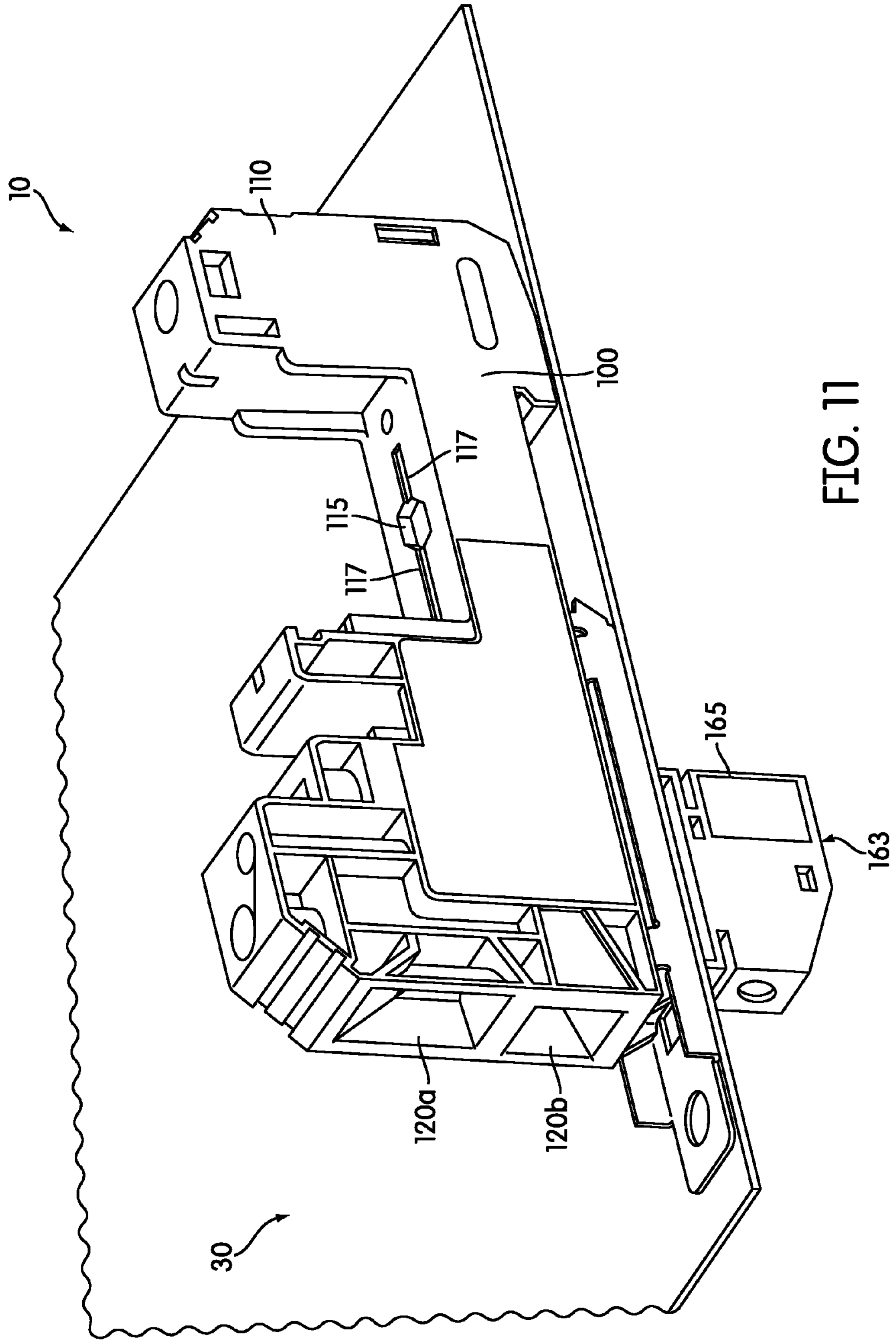
FIG. 11 illustrates a base for a terminal block in accordance with still another exemplary embodiment.

In some cases, railroad signal systems employ a configuration sometimes referred to as a Faraday cage, in which a metal barrier is used to block out external static electric fields. As a result, the field (or other) wire must pass through the barrier, which may result in the field wire approaching the terminal block 10 from a different orientation than the house wire. To accommodate such situations, FIG. 11 illustrates a terminal block 10 that includes an adaptor 165 that attaches to the underside of the terminal block 10 and can be positioned on the opposite side of the Faraday cage barrier 30 from the terminal body 100. The adaptor 165 has an opening 163 formed therein to receive the field wire which can be secured by a clamp positioned within the adaptor 165 in a similar manner as previously described, with a field plate (not shown) connecting the adaptor clamp to the disconnect switch 300 internally within the terminal body 100, again in a similar manner to that shown in the non-Faraday cage embodiments.

Figure 12:
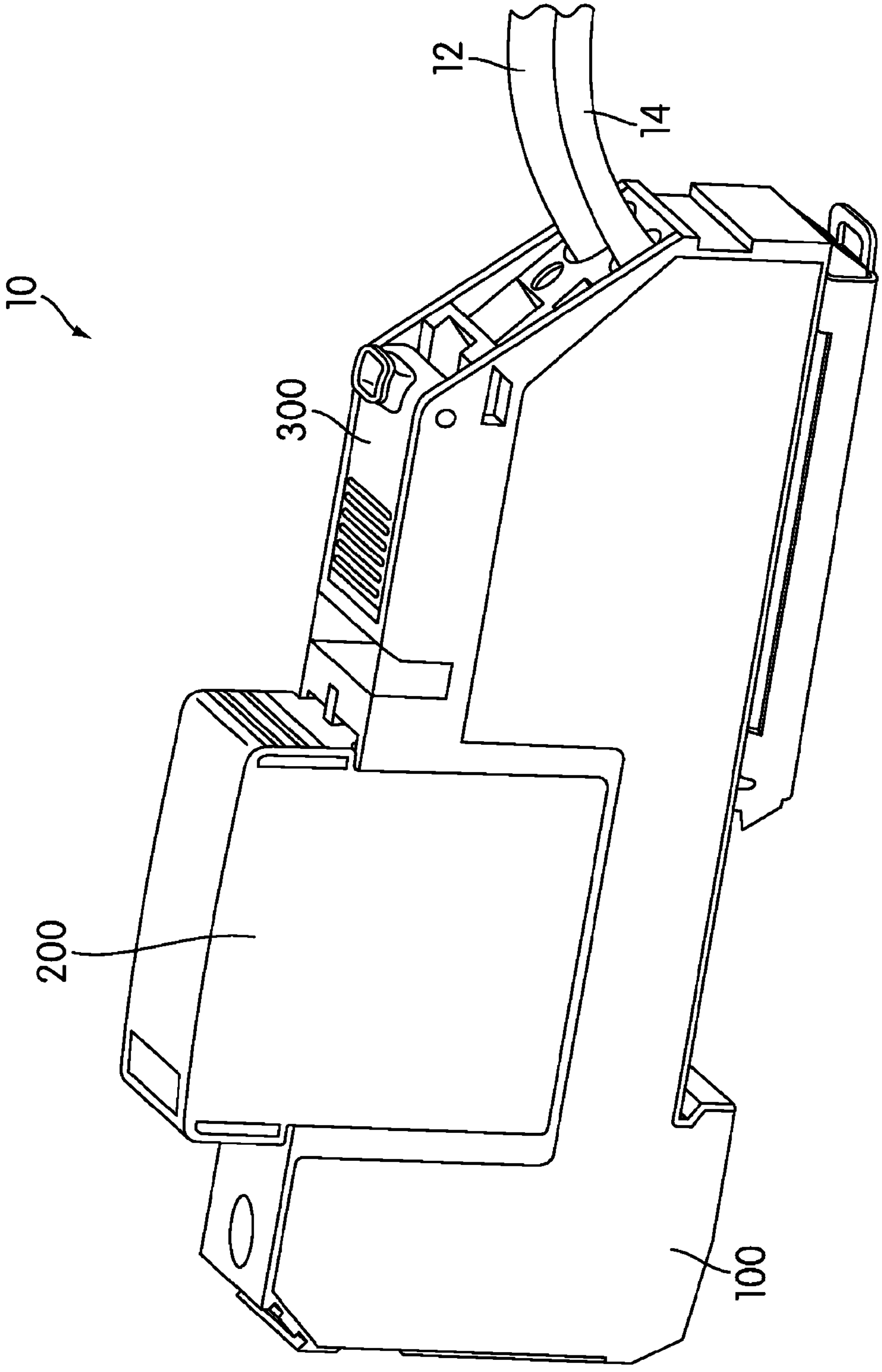
FIG. 12 illustrates a terminal block in accordance with yet another exemplary embodiment.
Figure 13A:
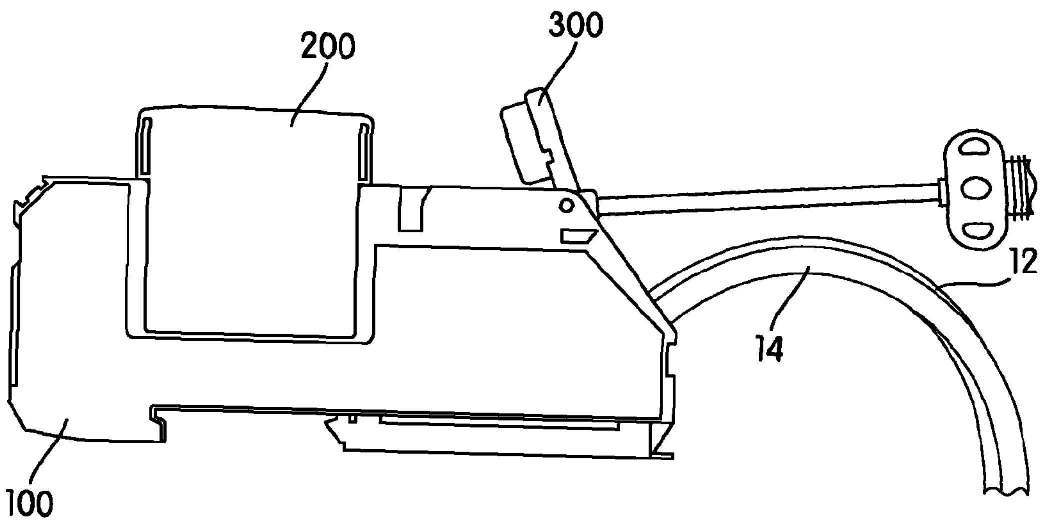
FIGS. 13*a* and 13*b* illustrate alternative views of the terminal block shown in FIG. 12.
Figure 13B:
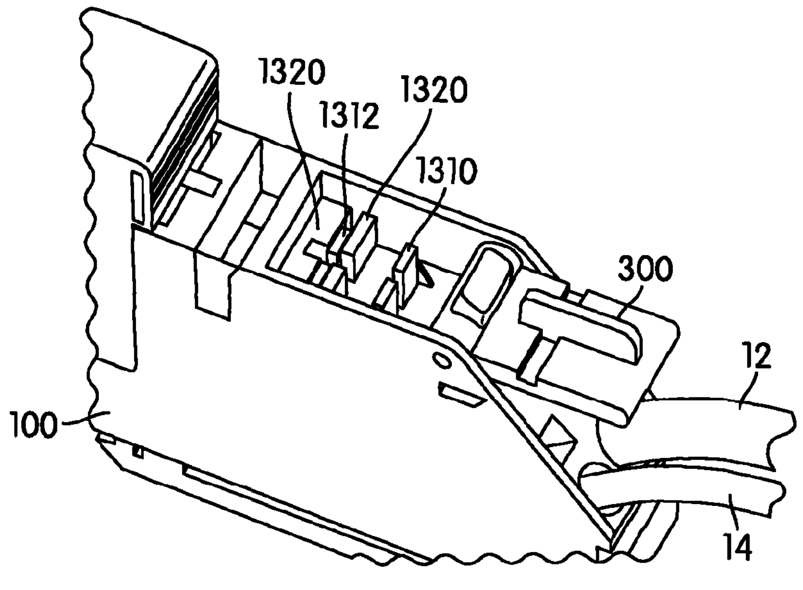

According to yet another embodiment, shown in FIGS. 12, 13*a* and 13*b*, the disconnect switch 300 may be provided as an access door style knife switch that can be actuated between an operative, connected position (FIG. 12) and an open, disconnected position (FIGS. 13*a*, 13*b*). As illustrated, the switch may be actuated by a screwdriver, although any method of actuating the switch may be employed.

FIG. 13*b* shows a partial perspective view of the terminal block 10 with the knife switch in the open position to reveal field and house terminals 1310, 1312, which are in contact with the field and house plates (not shown in FIG. 13*b*) contained within the terminal body 100. In this embodiment, a direct connection to the field terminal 1310 is exposed and available to serve as a ready test point for conducting insulation integrity testing on the associated field wire. Because the house terminal 1312 is associated with the house wire that is not ordinarily meant to be tested, but in most cases remains energized, the terminal body housing 110 may be configured to shield the house terminal 1312 from unintended contact, for example, by having insulative walls 1320 positioned on either side of the house terminal 1312.

Figure 14A:
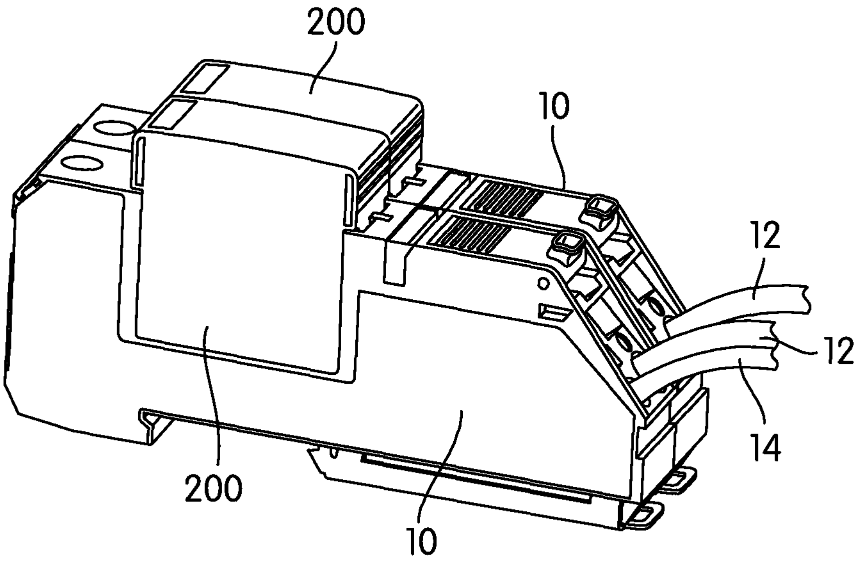
FIGS. 14*a* and 14*b* illustrate a plurality of terminal blocks in accordance with an exemplary embodiment.
Figure 14B:
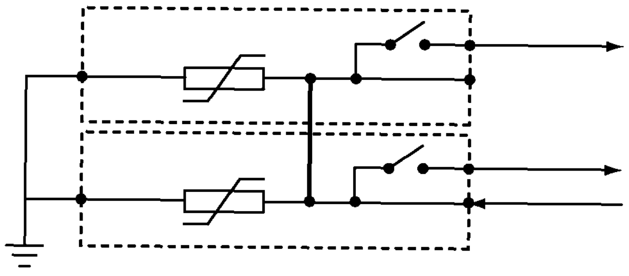
Figure 15A:
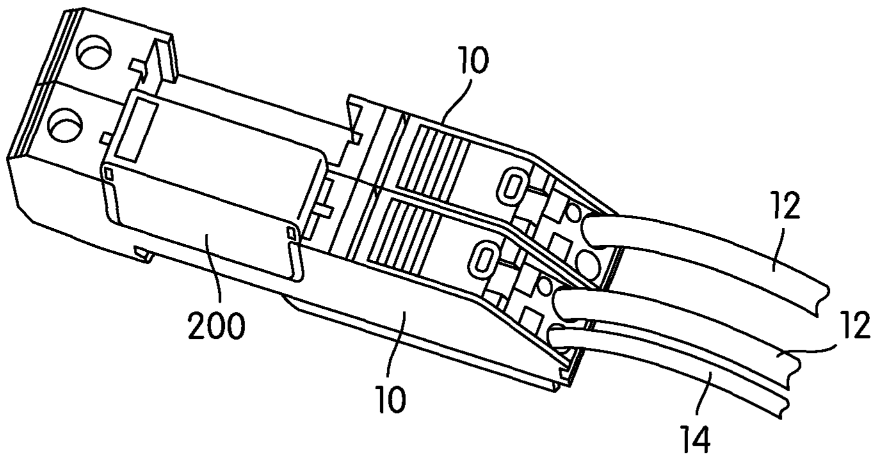
FIGS. 15*a* and 15*b* illustrate a plurality of terminal blocks in accordance with another exemplary embodiment.
Figure 15B:
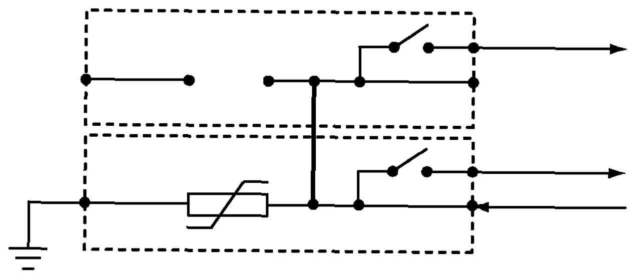

In bridged circuits, surge protection can be used for both terminal block modules of the circuit or, if desired, surge protection may be used with only one terminal block within the module, as illustrated in FIGS. 14*a* and 15*a* and represented diagrammatically in FIGS. 14*b* and 15*b*, respectively. In embodiments in which a pluggable surge protector is used, whether surge protection is used or not used in a particular module can be modified by inserting or removing a surge protection cartridge into the receptacle provided in the terminal block body.

In addition to using multiple terminal blocks as individual modules of a single bridged circuit, it will be appreciated that the terminal blocks themselves may be created as modular components. For example, the surge protection may be provided as a self-contained first module that attaches physically and electrically to a second module containing the disconnect switch and line attachments. The use of a modular construction may be advantageous to permit different switch arrangements to be used with a universal surge protection module, which can permit interchangeability to accommodate different numbers of input/output, different wire connection sizes, different wire connection types (screw clamp, spring cage, etc.), fusing, switching, current or voltage detection or a variety of other features that might be desirable in a particular instance.

Figure 18:
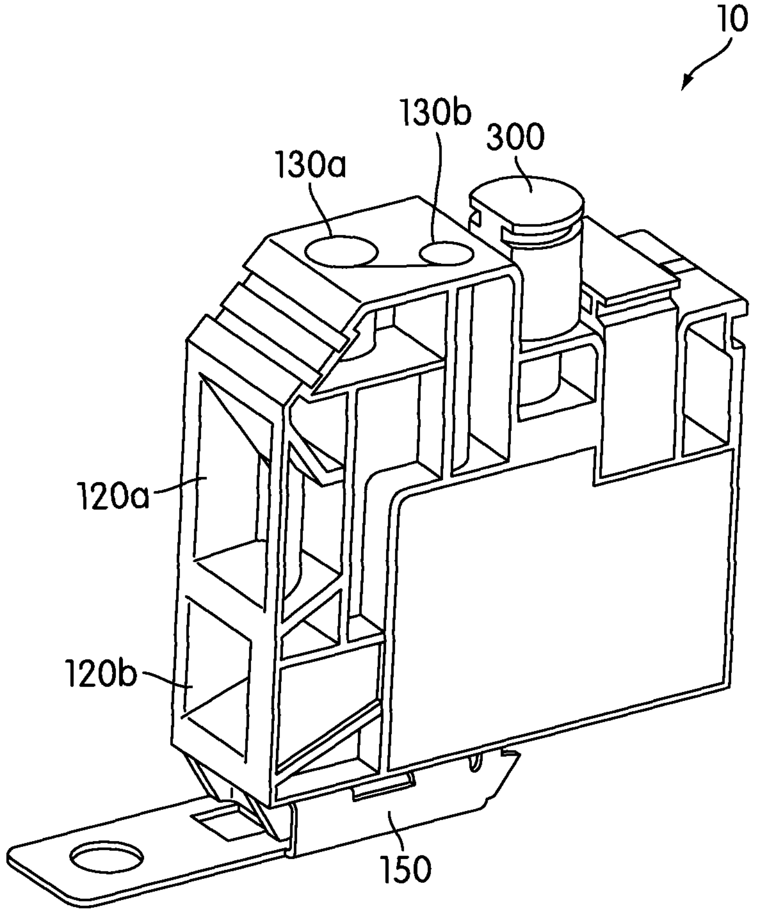
FIG. 18 illustrates a terminal block in accordance with another exemplary embodiment.

It will still further be appreciated that while embodiments are primarily described herein with respect to surge protection, various features described herein may also be used in conjunction with terminal blocks that complete a circuit without the use of a surge protection element, as shown, for example in FIG. 18.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A terminal block comprising:

a terminal body having a terminal body housing, the terminal body configured to receive a surge protection element;

a plurality of conductive elements arranged within the terminal body to create a continuous electrical path therethrough; and a disconnect switch integral the terminal body, the switch arranged to open the continuous electrical path, wherein the surge protection element, when received in the terminal body, forms a portion of the continuous electrical path so as to be in electrical communication with a first wire, a second wire, and a ground when the terminal block is in operation and the circuit is closed, wherein the surge protection element is also isolated from a current path between the first and second wires so as to be removable from the terminal block without interrupting the circuit when the circuit is closed.

2. The terminal block of claim 1, wherein the surge protection element is at least partially contained within a cartridge configured to be received by the terminal body.

3. The terminal block of claim 2, wherein the surge protection element is selected from the group consisting of an MOV and a spark gap element.

4. The terminal block of claim 2, wherein at least one of the conductive elements comprises a conductive contact configured to mechanically interface with a conductive contact of the cartridge.

5. The terminal block of claim 4, wherein the conductive contact configured to mechanically interface with the conductive contact of the cartridge comprises a monolithic tulip connector.

6. The terminal block of claim 1, wherein the disconnect switch actuates substantially along a single axis.

7. The terminal block of claim 1, wherein the disconnect switch comprises a variant pin.

8. The terminal block of claim 1, wherein the terminal body is configured to receive the first wire through a side wall of the terminal body housing.

9. The terminal block of claim 1, wherein the terminal body is configured to receive the first wire through a bottom wall of the terminal body housing.

10. The terminal block of claim 1, wherein the terminal body further comprises a rail slide on a bottom surface of the terminal body housing and wherein the terminal block is configured to attach to a DIN rail.

11. The terminal block of claim 1, further comprising a bridge configured to couple the terminal block to an adjacent second terminal block.

12. The terminal block of claim 11, wherein the terminal body is configured to receive an equalizer element arranged to equalize a current between the terminal block and the adjacent second terminal block.

13. The terminal block of claim 1, wherein the terminal body is configured as a monolithic base to receive at least two surge protection cartridges and an equalizer cartridge.

14. The terminal block of claim 1, configured so the first wire, when received in the terminal body is selectively disconnectable with the surge protection element and so that the second wire, when received in the terminal body, is in continuous electrical communication with the surge protection element.

15. The terminal block of claim 1, wherein the disconnect switch exposes a terminal outside the terminal body when switch is in an open configuration.

16. A terminal block for a railroad signal system comprising:

a terminal body having a terminal body housing, the terminal body having a surge protection cartridge receptacle, a field wire receptacle, a house wire receptacle and a ground receptacle formed therein;

a field clamp positioned within the terminal body adjacent the field wire receptacle to receive and retain a field wire of the railroad signal system inserted therein;

a first conductive element in electrical communication with the field clamp and a disconnect switch; and a second conductive element in electrical communication with the disconnect switch and a house clamp, the house clamp positioned within the terminal body adjacent the house wire receptacle to receive and retain a house wire of the railroad signal system inserted therein;

wherein the second conductive element is further in electrical communication with a first contact of a surge protection element, the surge protection element having a second contact in electrical communication with a third conductive element, wherein the third conductive element is in electrical communication with a ground clamp adjacent the ground receptacle, the surge protection element contacts arranged to being in parallel with a load of the circuit, wherein the surge protection element is disposed within a cartridge received by the terminal body, the cartridge removable from the terminal block without interrupting the circuit when the circuit is closed and under load.

17. A system comprising:

a first terminal block according to claim 1;

a second terminal block according to claim 1; and a conductive bridge connecting the first terminal block to the second terminal block to form a common circuit.

18. The system of claim 17 wherein the first terminal block is configured to receive an equalizer cartridge.

19. A method of implementing surge protection in a circuit of a railroad signal system comprising:

providing a terminal block according to claim 1;

securing the terminal block in a wayside rail shed;

providing a surge protection element to the terminal body;

terminating a field wire of a railroad signal system entering the wayside rail shed at a location internal the terminal body and terminating a house wire of a railroad signal system internal the terminal body to form the continuous electrical path between the field wire and the house wire via the disconnect switch; and connecting the terminal block to ground, such that the continuous electrical path further extends from the house wire through the surge protection element to ground.

20. The terminal block of claim 16, wherein the disconnect switch actuates substantially along a single axis.

21. The terminal block of claim 16, wherein the terminal block further comprises a status indicator configured to provide information about the operational status of the surge protection element.

22. The terminal block of claim 16, wherein the terminal body further comprises a terminal body adaptor connected to the terminal body housing, wherein the field or house wire receptacle is formed in the terminal body adaptor and the terminal body adaptor configured to connect to the terminal body housing while positioned on opposite sides of a metal barrier, the metal barrier having an aperture formed therein to permit the field or house wire to pass through the metal barrier.

23. The terminal block of claim 16, wherein the second conductive element comprises a plurality of apertures formed therein for receiving a conductive bridge.

24. The terminal block of claim 16, wherein the disconnect switch is a variant pin or a dual spring pin.

* * * * *